US 6,684,852 B2

(12) United States Patent
Wright et al.

(10) Patent No.: US 6,684,852 B2
(45) Date of Patent: Feb. 3, 2004

(54) INTERNAL COMBUSTION ENGINE OPERABLE IN PCCI MODE WITH POST-IGNITION INJECTION AND METHOD OF OPERATION

(75) Inventors: John F. Wright, Columbus, IN (US); Patrick M. Pierz, Columbus, IN (US); Axel O. zur Loye, Columbus, IN (US)

(73) Assignee: Cummins Inc., Columbus, IN (US)

( * ) Notice: Subject to any disclaimer, the term of this patent is extended or adjusted under 35 U.S.C. 154(b) by 340 days.

(21) Appl. No.: 09/850,405

(22) Filed: May 8, 2001

(65) Prior Publication Data

US 2002/0020388 A1 Feb. 21, 2002

Related U.S. Application Data

(60) Provisional application No. 60/202,850, filed on May 8, 2000.

(51) Int. Cl.[7] .................................................. F02B 7/00
(52) U.S. Cl. ...................... 123/431; 123/295; 123/527
(58) Field of Search .............................. 123/295, 431, 123/429, 526, 527, 525

(56) References Cited

U.S. PATENT DOCUMENTS

| | | | |
|---|---|---|---|
| 2,977,942 | A | 4/1961 | Reynolds |
| 3,924,598 | A | 12/1975 | Davis |
| 4,499,885 | A | 2/1985 | Weissenbach, deceased et al. |
| 4,572,133 | A | 2/1986 | Bago |
| 4,768,481 | A | 9/1988 | Wood |
| 4,924,828 | A | 5/1990 | Oppenheim |
| 5,048,470 | A | 9/1991 | Geddes et al. |
| 5,050,550 | A | 9/1991 | Gao |
| 5,060,610 | A | 10/1991 | Paro |
| 5,119,780 | A | 6/1992 | Ariga |
| 5,237,812 | A | 8/1993 | Mumford |
| 5,265,562 | A | 11/1993 | Kruse |

(List continued on next page.)

FOREIGN PATENT DOCUMENTS

| | | |
|---|---|---|
| DE | 195 19 663 A1 | 5/1996 |
| DE | 198 04 983 A1 | 8/1999 |
| DE | 198 10 935 A1 | 9/1999 |
| GB | 2 353 070 A | 2/2001 |

OTHER PUBLICATIONS

Shigeru Onishi et al., "Active Thermo–Atmosphere Combusion (ATAC)—A New Combustion Process for Internal Combustion Engines", SAE Technical Paper No. 790501, Feb. 26–Mar. 2, 1979.

Masaaki Noguchi et al., "A Study on Gasoline Engine Combustion by Observation of Intermediate Reactive Products during Combustion", SAE Technical Paper No. 790840, Sep. 10–13, 1979.

Paul M. Najt et al, "Compression–Ignited Homogeneous Charge Combustion", SAE Technical Paper No. 830264, (1983).

(List continued on next page.)

*Primary Examiner*—Bibhu Mohanty
(74) *Attorney, Agent, or Firm*—Nixon Peabody LLP; Tim L. Brackett, Jr.

(57) ABSTRACT

A method and internal combustion engine operable in a premixed charge compression ignition mode, comprising a combustion chamber, an intake system for delivering intake air, a mixing device that mixes a first fuel with the intake air to provide a premixed charge of air and the first fuel, a direct fuel injector adapted to directly inject a second fuel into the combustion chamber, and a control system adapted to control the direct fuel injector in a manner to provide a post-ignition injection where the second fuel is directly injected into the combustion chamber after onset of ignition of the premixed charge in the combustion chamber. The second fuel is preferably injected into the combustion chamber during combustion of the premixed charge and/or shortly after combustion of the premixed charge in the combustion chamber.

58 Claims, 6 Drawing Sheets

U.S. PATENT DOCUMENTS

| | | | |
|---|---|---|---|
| 5,329,908 A | * | 7/1994 | Tarr et al. .................... 123/527 |
| 5,365,902 A | | 11/1994 | Hsu |
| 5,467,757 A | | 11/1995 | Yanagihara et al. |
| 5,535,716 A | | 7/1996 | Sato et al. |
| 5,549,087 A | | 8/1996 | Gray, Jr. et al. |
| 5,609,131 A | | 3/1997 | Gray, Jr. et al. |
| 5,642,705 A | | 7/1997 | Morikawa et al. |
| 5,713,328 A | | 2/1998 | Anderson et al. |
| 6,026,781 A | * | 2/2000 | Imatake et al. ............. 123/299 |
| 6,032,617 A | | 3/2000 | Willi et al. |
| 6,230,683 B1 | | 5/2001 | zur Loye et al. |
| 6,276,334 B1 | | 8/2001 | Flynn et al. |
| 6,286,482 B1 | | 9/2001 | Flynn et al. |

OTHER PUBLICATIONS

Haruyuki Yokota et al., A New Concept for Low Emission Diesel Combustion:, JASE Automobile Technology, vol. 51, No. 9, 1997, pp. 47–52.

Haruyuki Yokota et al., "A New Concept for Low Emission Diesel Combustion", SAE Technical Paper No. 970891, Feb. 24–27, 1997.

J. Ray Smith, et al., "Homogeneous Diesel Combustion", Jun. 18, 1996, pp. 1–4.

"Clean Heavy–Duty Diesel Engine–II Program—Homogeneous Charge Compression Ignition (HCCI) of Diesel Fuel", SWRI Project No. 03–7479, Southwest Research Institute, Nov. 1997.

* cited by examiner

INTERNAL COMBUSTION ENGINE OPERABLE IN PCCI MODE WITH POST-IGNITION INJECTION AND METHOD OF OPERATION

This application claims priority to U.S. Provisional Application Serial No. 60/202,850 filed on May 8, 2000.

BACKGROUND OF THE INVENTION

1. Field of the Invention

The present invention is directed to an improved internal combustion engine for increasing fuel efficiency while reducing exhaust emissions and a method of operating such an engine. In particular, the present invention is directed to such an engine operable in a premixed charge compression ignition mode.

2. Description of Related Art

Relatively recently, because of the increased regulatory pressure for fuel efficient and low emissions engines, some engine designers have directed their efforts to one type of an internal combustion engine which utilizes premixed charge compression ignition (PCCI). Researchers have used various other names in referencing PCCI combustion including homogeneous charge compression ignition (HCCI) as well as others such as "ATAC" which stands for "Active Thermo-Atmosphere Combustion." (SAE Technical Paper No. 790501, Feb. 26–Mar. 2, 1979), "TS" which stands for "Toyota-Soken" (SAE Technical Paper No. 790840, Sep. 10–13, 1979), and "CIHC" which stands for "compression-ignited homogeneous charge" (SAE Paper No. 830264, 1983). All of these terms are hereinafter collectively referred to as PCCI.

Generally, conventional internal combustion engines are either a diesel or a spark ignited engine, the diesel engine controlling the start of combustion (SOC) by the timing of fuel injection while a spark ignited engine controls the SOC by the spark timing. Initially, it should be understood that SOC refers to the point in time at which a charge within the cylinder begins to ignite. The major advantage that a spark ignited natural gas or gasoline engine has over a diesel engine is its ability to achieve extremely low NOx and particulate emissions levels. The major advantage that diesel engines have over premixed charge spark ignited engines is in its higher thermal efficiency. One key reason for the higher efficiency of diesel engines is its ability to use higher compression ratios than premixed charge spark ignited engines since the compression ratio in premixed charge spark ignited engine must be kept relatively low to avoid knock.

A second key reason for the higher efficiency of diesel engines lies in the ability to control the diesel engine's power output without a throttle. This eliminates the throttling losses of premixed charge spark ignited engines and results in significantly higher efficiency at part load for diesel engines. Typical diesel engines, however, cannot achieve the very low NOx and particulate emissions levels which are possible with premixed charge spark ignited engines. Due to the mixing controlled nature of diesel combustion, a large fraction of the fuel exists at a very fuel rich equivalence ratio which is known to lead to particulate emissions. Premixed charge spark ignited engines, on the other hand, have nearly homogeneous air fuel mixtures which tend to be either lean or close to stoichiometric, resulting in very low particulate emissions. Another consideration is that the mixing controlled combustion in diesel engines occurs when the fuel and air exist at a near stoichiometric equivalence ratio which leads to high temperatures. The high temperatures, in turn, cause high NOx emissions. Premixed charge spark ignited engines, on the other hand, either have much lower NOx emissions or their NOx emissions can be reduced to very low levels with a three-way catalyst.

Another type of engine that has been recent focus of research and has been proposed and studied in the prior art is a direct injection natural gas engine that utilizes compression ignition. In such an engine, highly pressurized natural gas is injected directly into the combustion chamber during or after compression so that the heat generated by compression ignites the injected natural gas in a manner similar to that of diesel injection applications. Such combustion is typically aided by a glow plug and/or a pilot injection and the direct injection natural gas engine allows higher compression ratios than a comparable spark ignition natural gas engine. Hence, the gross thermal efficiency of a direct injection natural gas engine is known to be higher than that of a spark ignition natural gas engine. However, a direct injection natural gas engine requires the natural gas to be compressed to very high pressures such as 3000 psi or greater which is very difficult to attain. This required compression process requires a substantial amount of work which reduces the brake thermal efficiency of the direct injection natural gas engine. Consequently, whereas the emission performance in a direct injection natural gas engine has been found to be better than a conventional diesel engine, the higher emissions (as compared to a spark ignited engine) as well as complexity and high cost has minimized the commercial appeal.

Unlike the above described internal combustion engines, engines operating on PCCI principles rely on autoignition of a relatively well premixed fuel/air mixture to initiate combustion. More specifically, in PCCI engines, the fuel and air are mixed in the intake port or in the cylinder, long before ignition occurs. The extent of the homogeneity of the mixture may be varied depending on the combustion characteristics desired. Some engines may be designed and/or operated to ensure that the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Thus, PCCI combustion event is characterized in that: 1) the majority of the fuel is sufficiently premixed with the air to form a combustible mixture throughout the charge at the time of ignition; and 2) ignition is initiated by compression ignition. In addition, PCCI combustion is also preferably characterized in that most of the mixture is significantly leaner than stoichiometric to advantageously reduce emissions, unlike the typical diesel engine cycle in which a large portion, or all, of the mixture exists in a rich state during combustion. Because an engine operating on PCCI combustion principles has the potential for providing the excellent fuel economy of the diesel engine while providing NOx and particulate emissions levels that are much lower than that of current spark ignited engine, it has also recently been the subject of extensive research and development.

It is now known that for efficient, low emission PCCI combustion, it is important to have the combustion event occur at an appropriate crank angle during the engine cycle. In this regard, it has further been found that the timing of the start of combustion (SOC) and the combustion rate (therefore combustion duration) in a PCCI engine primarily depend on various combustion history values such as the temperature history; the pressure history; fuel autoignition properties (e.g. octane/methane rating or activation energy); and trapped cylinder charge air composition (oxygen content, EGR, humidity, equivalence ratio etc.). However, it should be understood that the term PCCI does not exclude the use of ignition timing mechanisms such as pilot injections and spark ignition known in the art that are used to precisely time the ignition of the premixed charge. Whereas the premixed charge may combust due to compression, such ignition timing mechanisms aid in initiating the SOC of the premixed charge at a precise time to ensure desirable combustion characteristics. This is in contrast to non-PCCI engines such as conventional gasoline engines with spark ignition in which the premixed charge of gasoline and air would not ignite at all without the spark.

A premixed charge compression ignition engine with optimal combustion control with various control features for controlling SOC and the combustion rate is disclosed in the patent application Ser. No. 08/916,437 filed on Aug. 22, 1997, currently assigned to the Assignee of the present invention. This application has also been published as International Patent Application No. PCT/US97/14815. As disclosed in the '437 application, active control is desirable to maintain the SOC and duration of combustion at the desired location of the crankshaft and at the desired duration, respectively, to achieve effective, efficient PCCI combustion with high efficiency and low NOx emissions. In this regard, the '437 application discloses a PCCI engine comprising a combustion history control system that includes at least one of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture. The engine uses an operating condition detecting device that detects an engine operating condition and provides a corresponding signal to a processor that generates one or more control signals to control the combustion history control system such as the temperature control system, the pressure control system, the equivalence ratio control system and/or the mixture autoignition property control system. In this manner, the variable control the combustion history of future combustion events may be attained. A start of combustion (SOC) sensor such as a cylinder pressure sensor may be used to sense the start of combustion so that effective feedback control may be also attained.

The '437 application further discloses the use of an injector to inject additional gas or liquid such as diesel fuel into the cylinder to time the PCCI combustion event. In this regard, diesel fuel may be injected either early in the compression event or later in the compression event near top dead center (TDC) to initiate a PCCI combustion event. Thus, the late injection serves a similar function to diesel pilot operation in that it adds a small amount of stratified fuel which can be either spark or compression ignited to help ignite the premixed fuel to thereby initiate the PCCI combustion event. Such diesel pilot has been found to be advantageous in that it provides an effective way to initiate ignition of the premixed charge and to control SOC in a PCCI engine. As further discussed, such pilot has also been effective to ensure PCCI combustion especially during the transition between the different modes of operation or during engine starting. Thus, in accordance with the '437 application as well as the know prior art techniques of diesel pilot operation, the late injection occurs prior to the PCCI combustion of the premixed charge and serves the function of ensuring that the premixed charges is ignited to initiate the PCCI combustion event.

Despite these significant recent developments in the technology of internal combustion engines, there still exists an unfulfilled need to further increase the fuel efficiency of internal combustion engines while minimizing exhaust emissions. These further improvements to exhaust emissions are desirable and necessary to ensure meeting the ever increasingly stringent government emissions requirements, especially with respect to NOx emission levels which has been difficult to reduce further using the presently known technology and methods.

SUMMARY OF THE INVENTION

In view of the foregoing, it is an object of the present invention to provide an improved internal combustion engine with increased fuel efficiency and a method for operating such an engine.

Another object of the present invention is to provide such an engine and method that reduces exhaust emissions.

A third object of the present invention is to provide an internal combustion engine and method that operates in a premixed charge compression ignition mode with increased fuel efficiency and reduced emissions.

Yet another object of the present invention is to provide such an internal combustion engine and method that increases fuel efficiency and reduces emissions by providing a post-ignition injection after the initiation of ignition of the premixed charge.

Still another object of the present invention is to increase brake mean effective pressure (BMEP) while maintaining the peak cylinder pressure below a desired maximum cylinder pressure using the post-ignition injection.

In accordance with the preferred embodiments of the present invention, these objects are obtained by an improved internal combustion engine operable in a premixed charge compression ignition mode where at least a portion of fuel is combusted in a PCCI combustion event, comprising an engine body with a piston assembly, a combustion chamber formed in the engine body by the piston assembly, an intake system for delivering intake air to the combustion chamber, a mixing device that mixes a first fuel with the intake air to provide a premixed charge of air and the first fuel, a direct fuel injector adapted to directly inject a second fuel into the combustion chamber, and a control system adapted to control the direct fuel injector in a manner to provide a post-ignition injection where the second fuel is directly injected into the combustion chamber after onset of ignition of the premixed charge in the combustion chamber. In this regard, the second fuel is preferably injected into the combustion chamber at least one of during combustion of the premixed charge and/or shortly after combustion of the premixed charge in the combustion chamber.

In accordance with one embodiment, the first fuel and the second fuel are both the same type of fuel such as natural gas or diesel. In another embodiment, the first fuel and the second fuel are different types of fuels. In a preferred embodiment, the first fuel is natural gas while the second fuel is diesel. In accordance with one preferred embodiment, the control system is further adapted to control at least one of injection timing, injection duration, injection rate and injection amount of second fuel injected by the direct fuel injector. In this regard, the control system may be adapted to variably control amount of the second fuel injected by the direct fuel injector relative to amount of the first fuel based on at least one of an operating condition and operating mode of the internal combustion engine. The second fuel injected by the direct fuel injector may constitute 0.1 to 50 percent of total fuel combusted in the combustion chamber, or preferably, constitute 0.1 to 25 percent of total fuel combusted in the combustion chamber. Moreover, if the internal combustion engine includes a plurality of cylinders, the amount of second fuel injected may be varied in fewer than all of the plurality of cylinders at a time.

In accordance with still other embodiments of the present invention, the internal combustion engine may further include a sensor that generates a signal indicative of cylinder pressure in the combustion chamber. The sensor may be at least one of a pressure sensor, accelerometer, ion probe, optical diagnostic, strain gage, load washer, fast thermocouple, torque sensor, RPM sensor and emissions sensor. The direct fuel injector may be adapted to inject the second fuel when the sensor senses a predetermined reduction in cylinder pressure in the combustion chamber. In this regard, the injection rate of the second fuel may be controlled by the control system to maintain a substantially constant cylinder pressure that is not greater than a desired maximum cylinder pressure during a predetermined range of motion of the piston assembly, while increasing the brake mean effective pressure (BMEP) of the engine.

The mixing device may include at least one of a carburetor, a throttle body injector, and a port fuel injector that is adapted to mix air and the first fuel upstream of the combustion chamber. Alternatively, or in addition, the mixing device may be a fuel injecting device adapted to directly inject the first fuel into the combustion chamber. In such an embodiment, the fuel injecting device may be the direct fuel injector itself so that direct fuel injector provides both the first fuel and the second fuel to the combustion chamber, and may further include a high pressure system for pressurizing the first fuel prior to directly injecting the first fuel into the combustion chamber. In other embodiments, the mixing device may be a first direct fuel injector adapted to directly inject the first fuel into the combustion chamber and the direct fuel injector may be a second direct fuel injector adapted to directly inject the second fuel into the combustion chamber. Moreover, in any of these embodiments, the direct fuel injector may be further adapted to provide an injection such as a pilot injection or early control injection prior to ignition of the premixed charge to time the start of combustion of the premixed charge in the combustion chamber.

In addition, in accordance with the embodiments of the present invention, these objects are obtained by a method of operating an internal combustion engine in a premixed charge compression ignition mode where at least a portion of fuel is combusted in a PCCI combustion event, the internal combustion engine including a piston assembly defining a combustion chamber, the method comprising the steps of delivering at least intake air to the combustion chamber during an intake stroke of the piston assembly, mixing a first fuel with the intake air to provide a premixed charge of air and the first fuel, performing a compression stroke of the piston assembly after the intake stroke, igniting the premixed charge, and directly injecting a second fuel into the combustion chamber after onset of ignition of the premixed charge. In this regard, the second fuel is preferably directly injected into the combustion chamber at least one of during the combustion of the premixed charge and/or shortly after combustion of the premixed charge in the combustion chamber.

In accordance with the other embodiments of the present method, the first fuel and the second fuel may be both same type of fuel such as natural gas. Alternatively, the first fuel and the second fuel may be different types of fuels. In this regard, the first fuel may be natural gas and the second fuel may be diesel. The present method may also include the step of controlling at least one of injection timing, injection duration, injection rate and injection amount of the second fuel based on an operating condition of the internal combustion engine. In this regard, the present method may include the step of variably controlling the amount of second fuel injected relative to amount of the first fuel based on at least one of an operating condition and operating mode of the internal combustion engine. The second fuel directly injected into the combustion chamber may constitute 0.1 to 50 percent of total fuel combusted in the combustion chamber, or preferably, constitute 0.1 to 25 percent of total fuel combusted in the combustion chamber. Moreover, if the internal combustion engine includes a plurality of cylinders, the amount of second fuel injected may be varied in fewer than all of said plurality of cylinders at a time.

In accordance with another embodiment, the present method may also include the step of sensing cylinder pressure in the combustion chamber, and directly injecting the second fuel based on sensed cylinder pressure. In this regard, the cylinder pressure may be sensed by a sensor that generates a signal indicative of cylinder pressure such as at least one of a pressure sensor, accelerometer, ion probe, optical diagnostic, strain gage, load washer, fast thermocouple, torque sensor, RPM sensor and emissions sensor. The second fuel may be directly injected into the combustion chamber upon sensing a predetermined reduction in cylinder pressure in the combustion chamber. Moreover, the present method may also include the step of controlling the injection rate of the second fuel to maintain a substantially constant cylinder pressure in the combustion chamber for a predetermined range of motion of the piston assembly, the substantially constant cylinder pressure being not greater than a desired maximum cylinder pressure in the combustion chamber.

The first fuel may be mixed with the air by at least one of a carburetor, a throttle body injector, a port fuel injector that injects the first fuel into the air upstream of the combustion chamber, and a direct fuel injector that injects the first fuel into the air in the combustion chamber. Moreover, the present method may also include the step of providing an injection such as a pilot injection and/or early control injection prior to ignition of the premixed charge to time the start of combustion of the premixed charge in the combustion chamber.

These and other objects, features and advantages of the present invention will become more apparent from the following detailed description of the preferred embodiments of the present invention when viewed in conjunction with the accompanying drawings.

DETAILED DESCRIPTION OF THE PREFERRED EMBODIMENT

The present invention as described in further detail herein below provides an improved internal combustion engine operable in a premixed charge compression ignition mode as well as a method of operating such an engine that improves fuel efficiency while reducing exhaust emissions which may be harmful to the environment. In this regard, it should be initially noted that the present invention may be applied to various different types of internal combustion engines that combust various fuels including (but not limited to) natural gas, gasoline, diesel, naphtha, propane, and/or other fuels. In addition, as previously described, premixed charge compression ignition (hereinafter "PCCI") refers to any engine or combustion process in which: 1) the majority of the fuel is sufficiently premixed with the air to form a combustible mixture throughout the charge at the time of ignition; and 2) ignition is initiated by compression ignition, thus including homogeneous charge compression ignition (HCCI) engines. It should be noted that the term PCCI as used herein does not exclude the use of ignition timing mechanisms such as pilot injections and spark ignition to precisely time the start of combustion of a premixed charge where the vast majority of the premixed charge will burn by compression ignition without the presence of a self-sustaining propagating flame front such as in a spark ignited engine. This allows a PCCI engine to combust a mixture that is too lean to support a self-sustaining flame front thereby allowing a premixed charge leaner than is possible in a spark ignited engine. Thus, such use of ignition timing mechanisms may be applied to the present invention as well.

Figure 1:
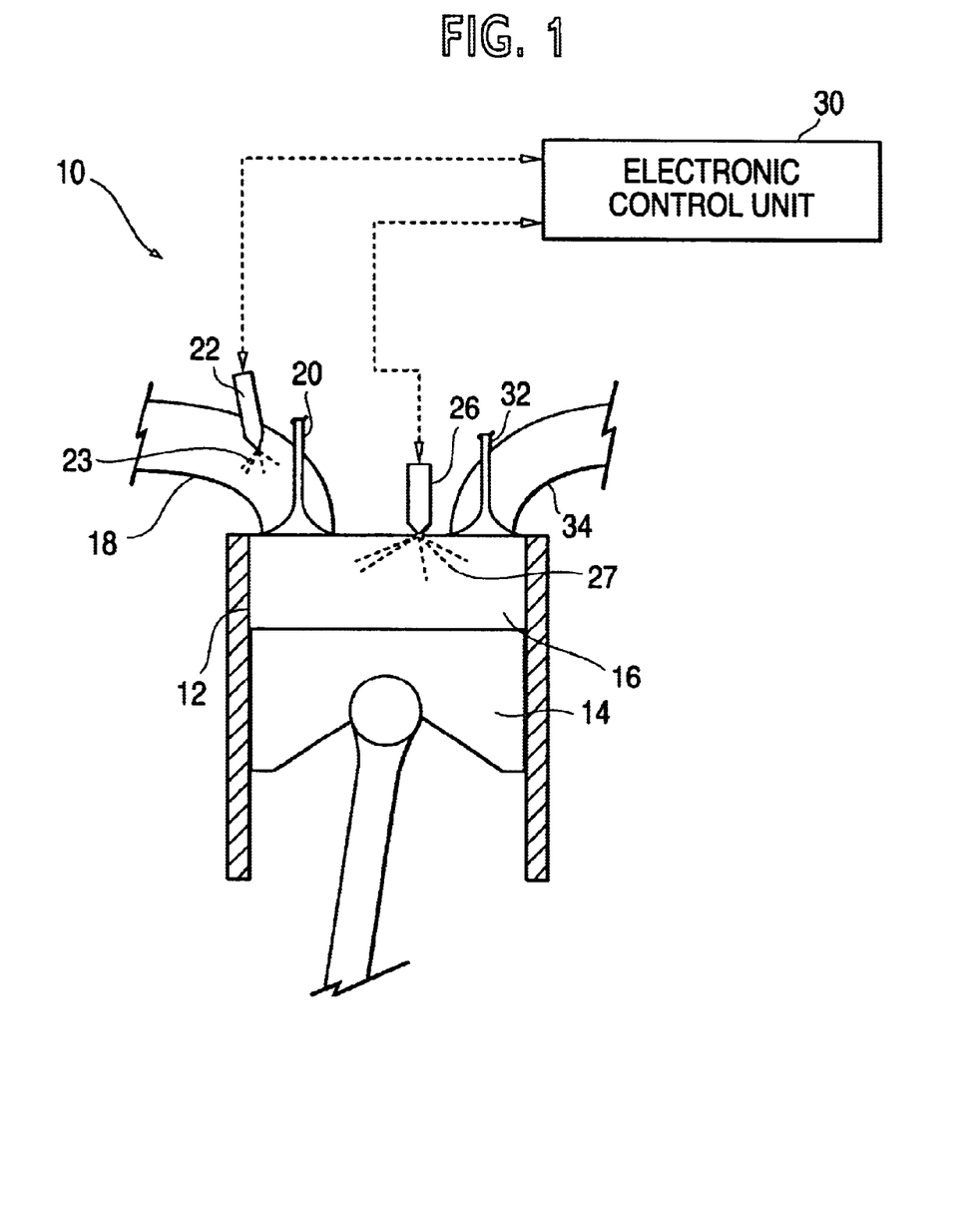
FIG. 1 is a schematic diagram a single cylinder of an internal combustion engine in accordance with one embodiment of the present invention.

FIG. 1 generally illustrates an example PCCI internal combustion engine 10 to which one embodiment of the present invention may be applied. As illustrated, the internal combustion engine 10 includes an engine body 12 with a piston assembly 14 reciprocally mounted therein. The piston assembly 14 forms a combustion chamber 16 in the engine body 12 in a manner well known in the art. The internal combustion engine 10 also includes an intake system 18 for delivering intake air to the combustion chamber 16 through an intake valve 20. It should be noted that although only one cylinder is illustrated in FIG. 1, the present invention may be utilized in internal combustion engines of various configurations including engines having any number of cylinders, for example, a four, five, six, eight, ten, twelve, or sixteen cylinders, etc.

In accordance with the illustrated embodiment of the present invention, the internal combustion engine 10 includes a mixing device such as port fuel injector 22 that is adapted to mix intake air and a first fuel 23 upstream of the combustion chamber 16 to thereby provide premixed charge of air and the first fuel 23 to the combustion chamber 16. In the preferred embodiment of the present invention, the equivalence ratio of the premixed charge of air and the first fuel 23 may be leaner than 0.5. Of course, in other embodiments, other richer equivalence ratios such as 1.0 or even mixtures richer than stoichiometric may also be used. In addition, in the illustrated embodiment, the first fuel 23 is natural gas but in other embodiments, the first fuel 23 may be gasoline or other types of fuels or blends thereof as well. In addition, it should also be noted that other mixing devices may be used instead of the port fuel injector 16 such as a carburetor or a throttle body injector which are well known in the art. This premixed charge of air and the first fuel 23 is provided into the combustion chamber 16 and as the piston assembly compresses the premixed charge, the premixed charge is ignited due to the increased pressure and temperature in the combustion chamber 16 in a PCCI combustion event.

In addition, the internal combustion engine 10 in accordance with the present invention is further provided with a direct fuel injector 26 that is adapted to directly inject a second fuel 27, preferably at high pressure, into the combustion chamber 16. In the presently described embodiment, the second fuel 27 may be diesel which has been found by the present inventors to provide very desirable ignition and combustion properties when used in conjunction with the natural gas of the first fuel 23 in the manner described in further detail herein below. Of course, in other embodiments, other types of fuels or blends thereof may be used as well, including natural gas.

The direct fuel injector 26 is communicatively connected to a control system such as the electronic control unit (ECU) 30 shown in the embodiment of FIG. 1 that is adapted to control the direct fuel injector 26. In particular, in accordance with the present invention, the ECU 30 is adapted to control the direct fuel injector 26 in a manner to provide a post-ignition injection where the second fuel 27 is directly injected into the combustion chamber 16 after onset of ignition of the premixed charge in the combustion chamber 16. In this regard, the ECU 30 may include a processor such as a micro-controller, micro-processor, or other suitable micro-computing unit to control the direct fuel injector 26 or other components of the internal combustion engine 10 in a manner described in further detail below.

It should be noted that the term "ignition" should be distinguished from the general term "combustion". As used herein, the term "ignition" means the very onset of combustion or start of combustion whereas the term "combustion" is used generally to denote the burning process of fuel. This distinction is significant in that the second fuel 27 is injected into the combustion chamber 16 after the onset of ignition of the premixed charge. In this regard, the second fuel is preferably injected into the combustion chamber 16 at least one of during combustion of the premixed charge, and/or shortly after combustion of the premixed charge in the combustion chamber 16. Thus, the second fuel 27 can actually be injected during the combustion of the premixed charge or even subsequent to the PCCI combustion of the premixed charge.

Due to the combustion of the premixed charge of air and the first fuel 23 as well as the directly injected second fuel 27, the piston assembly 14 is forced downwardly in the engine body 12 and the piston assembly 14 transmits forces generated by the combustion to an engine drive system (not shown) which is generally known in the art. The combustion exhaust is removed from the combustion chamber 16 through the exhaust valve 32 and an exhaust system 34 which are also generally known in the art.

In accordance with one preferred embodiment of the present invention, the control system such as the ECU 30 is further adapted to control at least one of injection timing, injection duration, injection rate and injection amount of second fuel 27 injected by the direct fuel injector 26, and preferably, the mixing device such as the port fuel injector 22 as well in the manner shown in FIG. 1. The direct fuel injector 26 of the internal combustion engine 10 may then be controlled by the ECU 30 to variably control the amount of second fuel 27 injected relative to amount of the first fuel 23 injected by the port fuel injector 22 based on an operating condition of the internal combustion engine 10, the operating mode of the internal combustion engine 10, or other conditions. For instance, the above noted control of injection parameters may be based on an operating condition of the internal combustion engine 10 such as temperature, load, speed, throttle position, etc. and/or as otherwise directed by the operator. In this regard, the proportions of the first fuel 23 and the second fuel 27 may be pre-programmed in a look up table known in the related art or otherwise calculated by the ECU 30. Moreover, it should also be appreciated that the above described embodiment where the amount of the second fuel 27 injected is variably controlled is merely one example and in other embodiments, other parameters such as the previously noted injection timing, injection duration, and/or injection rate may be variably controlled by the ECU 30.

It should also be noted that whereas FIG. 1 shows both the first fuel 23 being injected by the port fuel injector 22 as well as the second fuel 27 being injected by the direct fuel injector 26, these events typically would not occur simultaneously. As discussed, the port fuel injector 22 injects the first fuel 23 into the intake air to thereby provide a premixed charge which is then provided to the combustion chamber 16 through the intake valve 20. As the premixed charge is ignited in the combustion chamber 16, the direct fuel injector 26 injects the second fuel 27 into the combustion chamber 16 to thereby provide the post-ignition injection in accordance with the present invention.

It should also be noted that the relative proportions of the first fuel 23 and the second fuel 27 may be widely varied depending on various parameters and operating conditions. In this regard, it should initially be noted that an extensive discussion of varies strategies for operating and controlling an engine operable in PCCI mode is presented in an application entitled "Multiple Operating Mode Engine And Method Of Operation" filed concurrently with the present application on May 8, 2001 (Docket No. 740270-2697; Ser. No. Unknown), the entire contents of which is hereby incorporated by reference.

With respect to the present invention, in certain operating conditions or operating modes of the internal combustion engine 10, the proportionate amount of first fuel 23 injected by the port fuel injector 23 may be very small such as 1% of the total fuel to be combusted while the proportionate amount of second fuel 27 injected is very large such as 99% of the total fuel to be combusted in the combustion chamber 16. Instances in which such proportionate amount of the first fuel 23 and the second fuel 27 are injected may be during starting of the internal combustion engine or during cold engine temperature operation where PCCI combustion of the premixed charge may be difficult to attain. It should also be understood that as used herein, the term "total fuel" means the total of first fuel 23 and second fuel 27 combined based on any measurable parameter. For instance, if the two fuels are conducive to being equivalently measured, the relative amount of the first fuel 23 and the second fuel 27 may be determined based on volume or mass. In other instances, the relative amount of the fuels may be determined based on energy content such as BTU or Joules, etc.

Inversely, in other operating conditions or operating modes of the internal combustion engine 10, the proportionate amount of first fuel 23 injected by the port fuel injector 23 may be very large such as 99.9% of the total fuel to be combusted while the proportionate amount of second fuel 27 injected by the direct fuel injector 26 into the combustion chamber 16 is very small such as 0.1% of the total fuel to be combusted in the combustion chamber 16. Instances in which such proportionate amount of the first fuel 23 and the second fuel 27 are injected may be during substantially steady state operation of the internal combustion engine during which fuel efficiency and reduced emissions as well as other advantages of PCCI combustion can be fully realized. Of course, the above two scenarios are extreme examples to generally illustrate an example range of the proportionate amounts of first fuel 23 injected by the port fuel injector 23 and the second fuel 27 injected by the direct fuel injector 26. The internal combustion engine 10 may be operated in a mode in which the proportionate amounts of the first fuel 23 and the second fuel 27 is somewhere in between these above extreme examples.

Moreover, the ECU may be further adapted to variably change the proportion of the first fuel 23 and the second fuel 27 during operation of the internal combustion engine 10 as the operating conditions change. Thus, during start up where the internal combustion engine 10 is cold, the first fuel 23 injected by the port fuel injector 23 may be very small such as 1% of the total fuel to be combusted while the proportionate amount of second fuel 27 injected is very large such as 99% of the total fuel to be combusted in the combustion chamber 16. The internal combustion engine 10 may be operated in this mode for a short duration to rapidly warm the engine. As the engine increases in temperature, the proportionate amount the first fuel 23 may be gradually increased whereas the amount of the second fuel 27 is correspondingly gradually decreased. For instance, at a certain temperature of the internal combustion engine 10, the engine may be operated in a mode in which the first fuel 23 and the second fuel 27 may both constitute 50% of the fuel to be combusted. As the temperature of the internal combustion engine 10 continues to increase, the proportionate amount of first fuel 23 may be further gradually increased while the proportionate amount of second fuel 27 is correspondingly decreased. As the temperature of the internal combustion engine 10 further increases, the proportions of the fuels can be further changed so that the amount of first fuel 23 injected by the port fuel injector 23 may be very large such as 99.9% while the amount of second fuel 27 injected by the direct fuel injector 26 into the combustion chamber 16 is very small such as 0.1% so that advantages such as increased fuel efficiency and reduced emissions as well as other advantages of PCCI combustion can be fully realized.

Of course, it should be appreciated that the above discussion regarding variably changing the proportionate amount of the first and second fuels based on one engine parameter, namely engine temperature, is only one example of the present invention. The proportionate amount of the first and second fuels may be variably changed based on any known engine parameter such as load, speed, throttle position, etc. and/or as otherwise directed by the operator. In addition, as previously noted, the proportionate amount of the first and second fuels may be pre-programmed or otherwise calculated by the ECU 30. Furthermore, in applications where the internal combustion engine 10 includes multiple cylinders such as four, six, eight, etc., the ECU 30 may be adopted to change the relative proportions of the first and second fuels for each cylinder separately. For instance, fewer than all of the plurality of cylinders at a time may be transitioned from an operation mode where most of the fuel is diesel to an operation mode where most of the fuel is natural gas to thereby further facilitate transitioning the operation mode of the internal combustion engine 10. Thus, in the above described manner, the internal combustion engine 10 may be controlled by the ECU 30 to be operated in various modes with differing proportions of the first and second fuels so that optimal combustion and operation of the internal combustion engine 10 may be attained.

However, to ensure minimal exhaust emissions especially in applications where the second fuel 27 is diesel and the first fuel 23 is natural gas as in the presently described embodiment, the second fuel 27 injected by the direct fuel injector 26 may constitute 0.1 to 50 percent of total fuel combusted in the combustion chamber 16. Preferably, the second fuel 27 constitutes 0.1 to 25 percent of total fuel combusted in the combustion chamber 16. Moreover, in the preferred embodiment, the ECU 30 may be adapted to control at least one of the mixing device 22 and the direct fuel injector 26 to provide an injection such as a pilot injection or early control injection prior to ignition of the premixed charge prior to the onset of ignition to precisely time the start of combustion of the premixed charge in the combustion chamber 16. By variably controlling the injection of the second fuel 27 into the combustion chamber 16, the combustion characteristics can be readily changed or otherwise controlled to provide optimal combustion based on the various operating conditions of the internal combustion engine 10 as described. In this manner, the present invention may be used to increase fuel efficiency, minimize exhaust emissions, especially NOx emissions, and reduce cost of operation.

Figure 2:
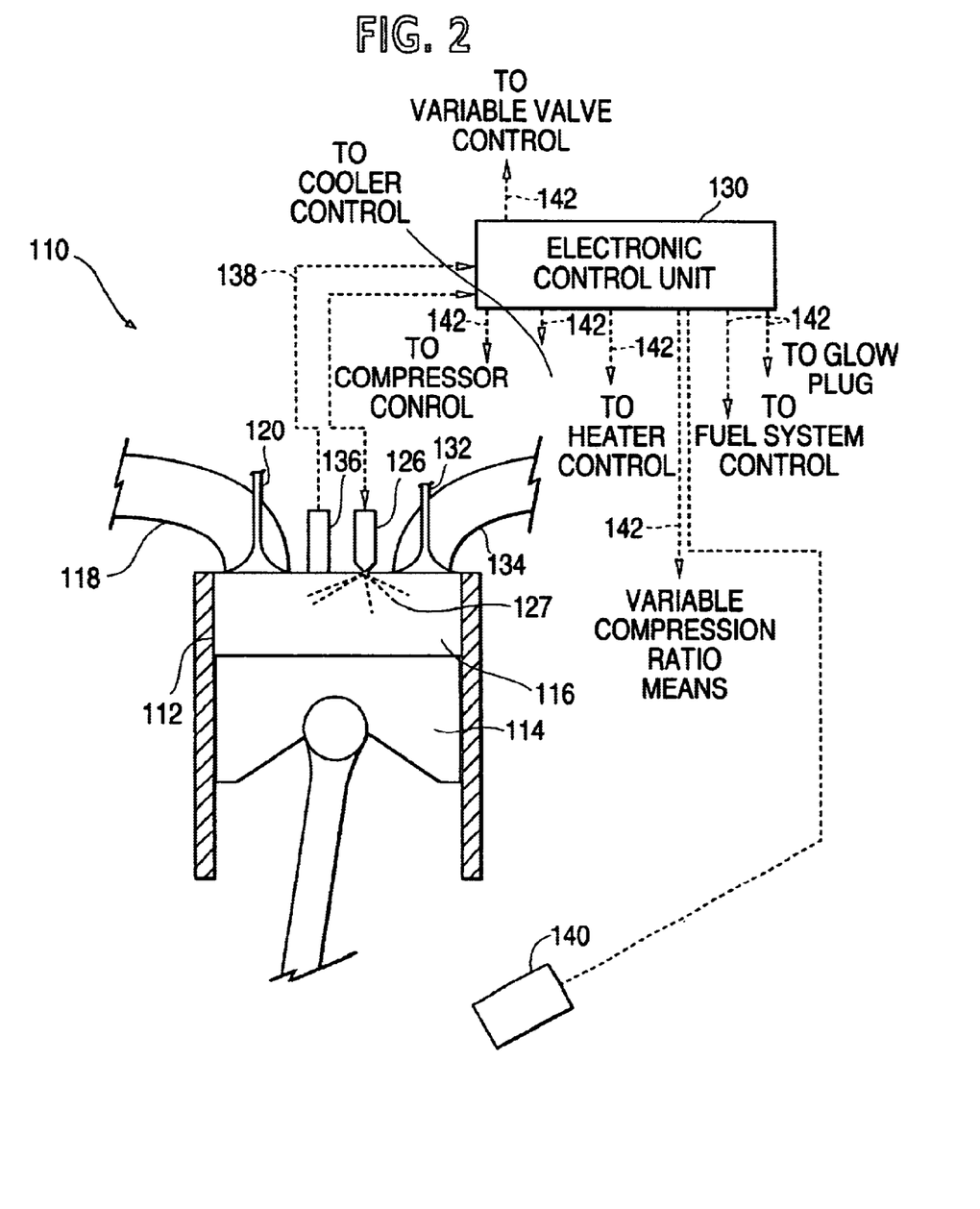
FIG. 2 is a schematic diagram a single cylinder of an internal combustion engine in accordance with another embodiment of the present invention.

FIG. 2 illustrates an internal combustion engine 110 in accordance with another embodiment of the present invention. The internal combustion engine 110 is similar to the embodiment of FIG. 1 in that it includes an engine body 112 with a piston assembly 114 reciprocally mounted therein, the piston assembly 114 forming a combustion chamber 116. The internal combustion engine 110 also includes an intake system 118 for delivering intake air to the combustion chamber 116 through an intake valve 120 as well as an exhaust valve 132 and an exhaust system 134 for removing combustion exhaust from the combustion chamber 116. Moreover, the internal combustion engine 110 also includes a direct fuel injector 126 controlled by a control system such as the ECU 130 in a manner to directly inject fuel into the combustion chamber 116 after the ignition of a premixed charge in the combustion chamber 116 as described relative to the embodiment of FIG. 1.

However, the internal combustion engine 110 in the illustrated embodiment of FIG. 2 does not include a carburetor, throttle body injector, or a port fuel injector as a mixing device. Instead, the mixing device is the direct fuel injector 126 itself so that the direct fuel injector 126 also performs the function of mixing the first fuel with the air as well as the function of directly injecting the second fuel. In this regard, in such an embodiment, the first fuel and the second fuel are preferably the same, for instance, natural gas. Of course, in other embodiments, the first fuel and the second fuel injected by the direct fuel injector 126 may also be other fuels including diesel, gasoline, naphtha or propane. Thus, the direct fuel injector 126 is adapted to initially inject the natural gas (or other first fuel) into intake air in the combustion chamber 116 that has been already drawn or is in the process of being drawn so that the natural gas and the intake air are mixed into a premixed charge and ignited in a PCCI manner. Then, after the premixed charge ignites, a post-ignition injection of the second fuel 127 which in this example is the same as the first fuel, namely natural gas, is made by the direct fuel injector 126, preferably at least one of during combustion of the premixed charge, and/or shortly after combustion of the premixed charge in the combustion chamber 116. Therefore, in the illustrated embodiment, the direct fuel injector 126 performs the functions of both the mixing device and the direct fuel injector of the embodiment of FIG. 1.

It should be recognized that such operation is made possible largely because both the first fuel and the second fuel are the same, for instance, natural gas, or in other embodiments, other types of fuel such as diesel or blends thereof. One advantage of using natural gas is that it is a gas phase fuel so that over penetration and resulting wall wetting problems of liquid phase fuels are substantially eliminated. It should also be noted that in such an embodiment, a high pressure system (not shown) would be desirable for pressurizing the natural gas prior to directly injecting it into the combustion chamber 116 to ensure proper premixing of the natural gas and air in the combustion chamber 116. However, such an embodiment where natural gas is used as the first and second fuels would require a high pressure system that may result in parasitic power loss from the operation of the internal combustion engine 110 and detriment its overall efficiency. Of course, it should also be noted that the direct fuel injector 126 of FIG. 2 may also be adapted to provide another injection such as a pilot injection or an early control injection prior to ignition of the premixed charge to allow precise timing of the SOC of the premixed charge in the combustion chamber 116.

In other embodiments, the direct fuel injector 126 may designed to be used to inject both the first fuel and the second fuel even when these fuels are different. In other embodiments, if the first fuel and the second fuel are not the same such as if the first fuel was natural gas and the second fuel is diesel, another direct fuel injector (not shown) may be provided for the specific purpose of directly injecting the natural gas into the combustion chamber 116 to provide the premixed charge. Thus, in such an embodiment, two direct injectors would be provided, a first direct injector to inject the first fuel and a second direct injector to inject the second fuel into the combustion chamber. In such embodiments, the second fuel would preferably be more easily compression ignited than the first fuel. However, in an instance where the two fuels are different, the embodiment of FIG. 1 discussed above may be more preferable since the mixing device such as a port fuel injector, throttle body injector or carburetor positioned upstream of the combustion chamber allows the first fuel to mix with the air for a longer duration to thereby provide a more evenly mixed premixed charge and provide a very economical solution.

The internal combustion engine 110 in the illustrated embodiment of FIG. 2 further includes various optional features discussed hereinbelow which are not required to practice the present invention but may be provided in combination with the present invention to provide an internal combustion engine which is operable in an optimized PCCI mode that further maximizes fuel efficiencies while minimizing exhaust emissions. As can be seen in FIG. 2, the internal combustion engine 110 includes an optional sensor 136 that generates a signal indicative of pressure in the combustion chamber 116. The sensor 136 is preferably a pressure sensor which generates a corresponding pressure data signal 138 which is provided to the control system such as the ECU 130.

The sensor 136 is communicatively connected to the control system such as the ECU 130 to provide preferably a real time measurement of the pressure in the combustion chamber 116. The direct fuel injector 126 can then be operated by the ECU 130 to inject the second fuel 127 when the sensor 136 senses a predetermined reduction in pressure in the combustion chamber 116. In this regard, the injection rate of the second fuel 127 may be controlled by the control system such as the ECU 130 to maintain a substantially constant cylinder pressure that is not greater than a desired maximum cylinder pressure during a predetermined range of motion of the piston assembly 114, such as during the power stroke of the piston assembly 114.

It should be noted that the sensor 136 may be provided on any or all engine cylinders of the internal combustion engine 110 for sensing, on a cycle-by-cycle basis, the pressure of the corresponding combustion chamber 116. While in the present embodiment, the sensor 136 that provides the pressure data signal 138 is a pressure sensor, other sensors may also be used that provide a signal indicative of cylinder pressure such as through use of correlating pressure data. Such sensors include accelerometers, ion probes, optical diagnostics, strain gages, load washers, and/or fast thermocouples in or near the cylinder head, liner or piston. Also, torque or RPM sensors could be used to detect changes in engine torque and RPM associated with each combustion event. Alternatively, or additionally, an emissions sensor could be used to detect emissions having a known correlation to the pressure generated by the combustion in the combustion chamber. Although these sensors do not directly provide cylinder pressure data or direct information regarding the combustion event, these sensors may be used in conjunction with pressure correlation data that provides corresponding cylinder pressure based on the parameter measured by such sensors. The details of a pressure sensor, accelerometer, ion probe, optical diagnostic, strain gage, load washer, fast thermocouple, torque sensor, RPM sensor and emissions sensor are known in the art and need not be discussed in further detail.

The pressure data signal 138 can also be used by the ECU 130 to monitor and further control various parameters of the internal combustion engine 110, especially in view of the fact that the internal combustion engine 110 in accordance with the present invention is operable in a PCCI combustion mode which is very difficult to control. For instance, it is now established that pressure in the combustion chamber 116 is indicative of the combustion history which may include the time at which combustion occurs (SOC), the rate of combustion, the duration of combustion and/or the completeness of combustion. Thus, the sensed pressure data signal 138 may be used to accurately determine the start of combustion (SOC) which refers to the point in time at which a charge within the cylinder begins to ignite. In this regard, the internal combustion engine 110 of the illustrated embodiment in FIG. 2 is also provided with a crank angle sensor 140 which monitors the angular position of the engine crank shaft (not shown) so that the SOC may be referenced with respect to the crank shaft location. Moreover, the crank angle sensor 140 can be used in conjunction with the pressure data signal 138 from the sensor 136 to accurately time the post-ignition injection of the second fuel 127 by the direct fuel injector 126. Of course, in other embodiments, the crank angle sensor 140 can be used to accurately time the injection of the first fuel as well as any pilot and/or control injections if they are provided. Therefore, with the real time monitoring of pressure in the combustion chamber 116, a closed-loop feedback control of the internal combustion engine 110 may be established with the ECU 130 to accurately control combustion and operational characteristics of the internal combustion engine 110.

Based on the SOC or other engine parameters, the ECU 130 may then generate a plurality of output signals, indicated as 142, for variably controlling components associated with a combustion history control system which may include one or more of a variable valve control, compressor control, cooler control, heater control, variable compression ratio control, fuel system control, and/or glow plug as shown for varying the autoignition property of the mixture. The specific details of variably controlling components associated with combustion history control system has been discussed in the patent application Serial No. 09/255,780 filed on Feb. 23, 1999, this application being currently assigned to the Assignee of the present invention and having also been published as an International Patent Application No. PCT/US99/03289, the entire contents of which is hereby incorporated by reference. In this manner, a closed-loop control of PCCI combustion can be established to aid in increasing fuel efficiency while minimizing exhaust emissions.

Figure 3:
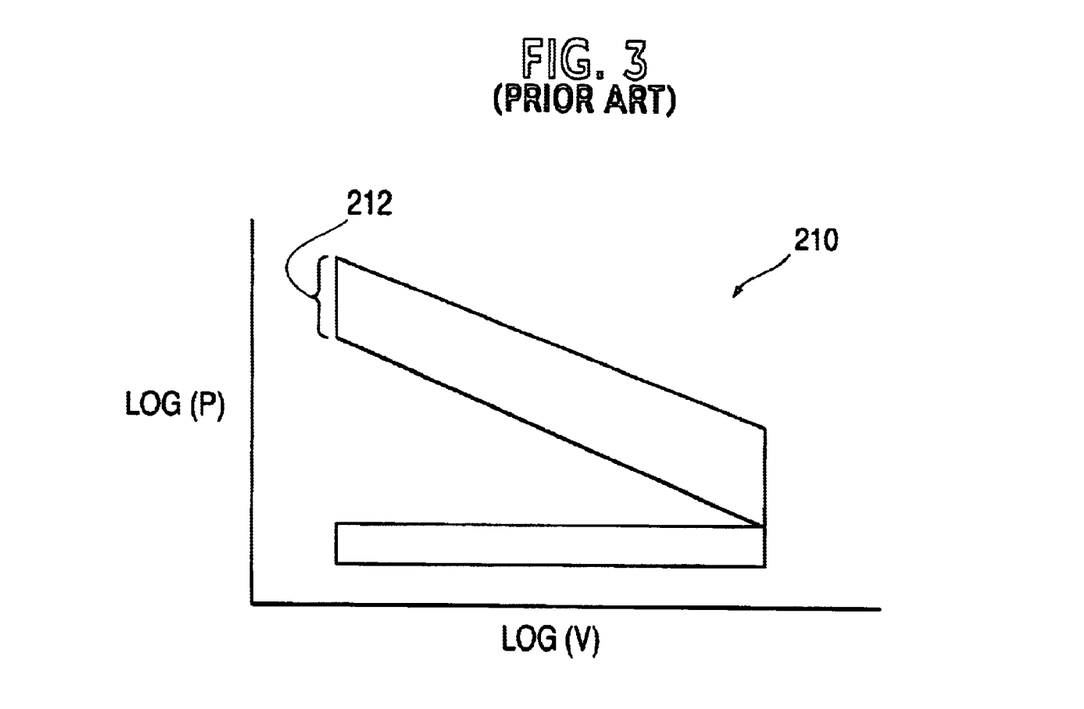
FIG. 3 is a graph showing combustion chamber pressure characteristics of a prior art internal combustion engine operating in a conventional PCCI mode.

FIG. 3 shows a graph of an idealized combustion cycle 210 of a PCCI internal combustion engine (not shown) operating in a conventional PCCI mode. As can be seen, the y-axis is the logarithm of the pressure in the combustion chamber (Log (P)) and the x-axis is the logarithm of the volume of the combustion chamber (Log (V)) as the piston assembly (not shown) is reciprocated within the engine during the combustion cycle 210. The segment 212 of the combustion cycle 210 represents the pressure increased in the combustion chamber by the ignition and combustion of the premixed charge by compression in a conventional PCCI mode. As can be seen by the segment 212, in the idealized combustion cycle 210, the PCCI combustion is very short and is a nearly constant volume combustion process. Such PCCI combustion can produce ultra low levels of NOx emissions.

Figure 4:
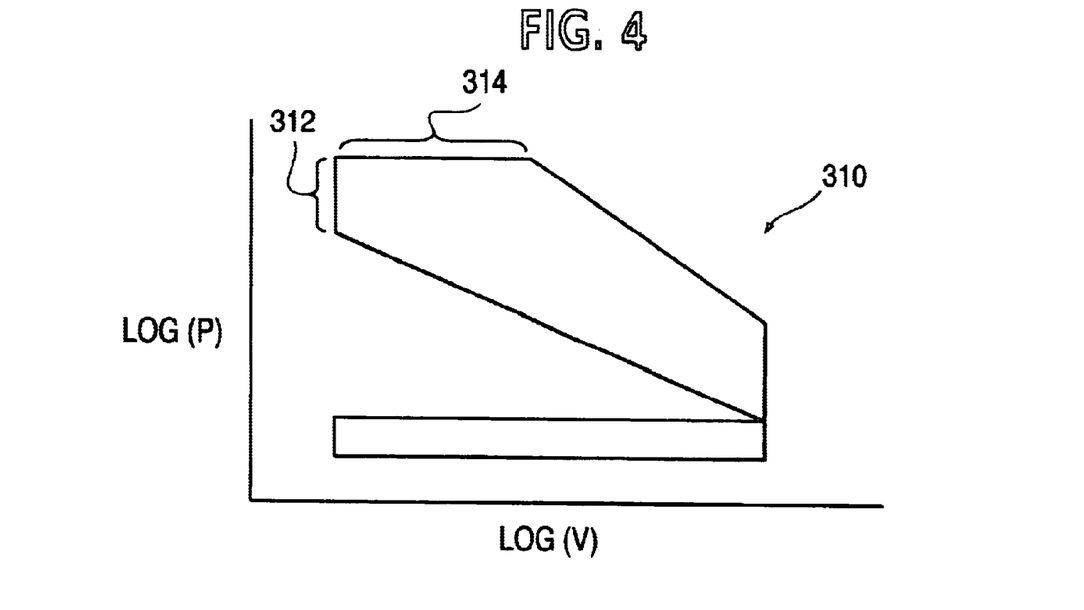
FIG. 4 is a graph showing combustion chamber pressure characteristics of an internal combustion engine operating in a PCCI mode in accordance with one embodiment of the present invention.

In contrast to FIG. 3, FIG. 4 shows an idealized combustion cycle 310 of a PCCI internal combustion engine operating in a PCCI mode in accordance with one embodiment of the present invention which includes the post-ignition injection by a direct fuel injector. Like FIG. 3, the y-axis is the logarithm of the pressure in the combustion chamber (Log (P)) and the x-axis is the logarithm of the volume of the combustion chamber (Log (V)) as the piston assembly (not shown) is reciprocated within the engine during the combustion cycle. Similar to FIG. 3, the segment 312 of the combustion cycle 310 represents the pressure increased in the combustion chamber by the ignition and combustion of the premixed charge. However, as can be seen, the combustion cycle 310 also includes segment 314 which represents the maintaining of substantially constant pressure in the combustion chamber of the internal combustion engine by directly injecting a second fuel into the combustion chamber. Thus, as shown by the segment 314, the expansion of the combusting charge continues in a nearly isobaric (constant pressure) manner until the termination of the post-ignition injection or the opening of the exhaust valve near the bottom dead center of the piston assembly. Since the volume of the combusting charge continues to increase during the constant pressure portion of the combustion shown in segment 314, the temperature of the charge also increases thereby aiding in lowering the CO and HC emissions that generally result from PCCI combustion. In this regard, it should be noted that it is known that PCCI combustion produces very low NOx emissions and typically exhibits a very rapid heat release so that the heat release is nearly constant volume combustion. It is also known that constant volume combustion produces lower power densities at the same desired maximum cylinder pressure while realizing the low NOx benefits of PCCI combustion.

As previously noted, the PCCI combustion represented by segment 314 typically produces ultra low levels of NOx emissions. The combustion due to direct injection of the second fuel in accordance with the embodiment of the present invention where the second fuel is diesel would produce NOx emissions at a rate that is similar to diffusion burn portion of combustion in a conventional diesel engine. The second fuel that is directly injected would typically have a very short ignition delay since the temperature in the combustion chamber would already be high due to the PCCI combustion of the premixed charge. By providing a combination of PCCI combustion and a diffusion burn portion of combustion in a conventional diesel engine, the present invention can provide a significant emissions improvement over conventional diesel engines. Similarly, soot levels would be lower since PCCI combustion generates virtually no soot. In the preferred embodiment, the post-ignition injection by the direct fuel injector terminates early enough to minimize soot production.

In addition, as also previously described, the internal combustion engine in accordance with one preferred embodiment of the present invention would be variably operable so that the proportional amount of first fuel combusted in PCCI and the amount of second fuel combusted by direct injection into the combustion chamber can be varied depending on the operational conditions or control by the operator. Thus, if proportionately more of the first fuel is to be combusted in PCCI as compared to the second fuel injected post-ignition, the segment 312 would be elongated while the segment 314 would be shortened. Conversely, if proportionately less of the first fuel is to be combusted in PCCI as compared to the second fuel injected post-ignition, the segment 312 would be shortened while the segment 314 would be elongated.

Figure 5:
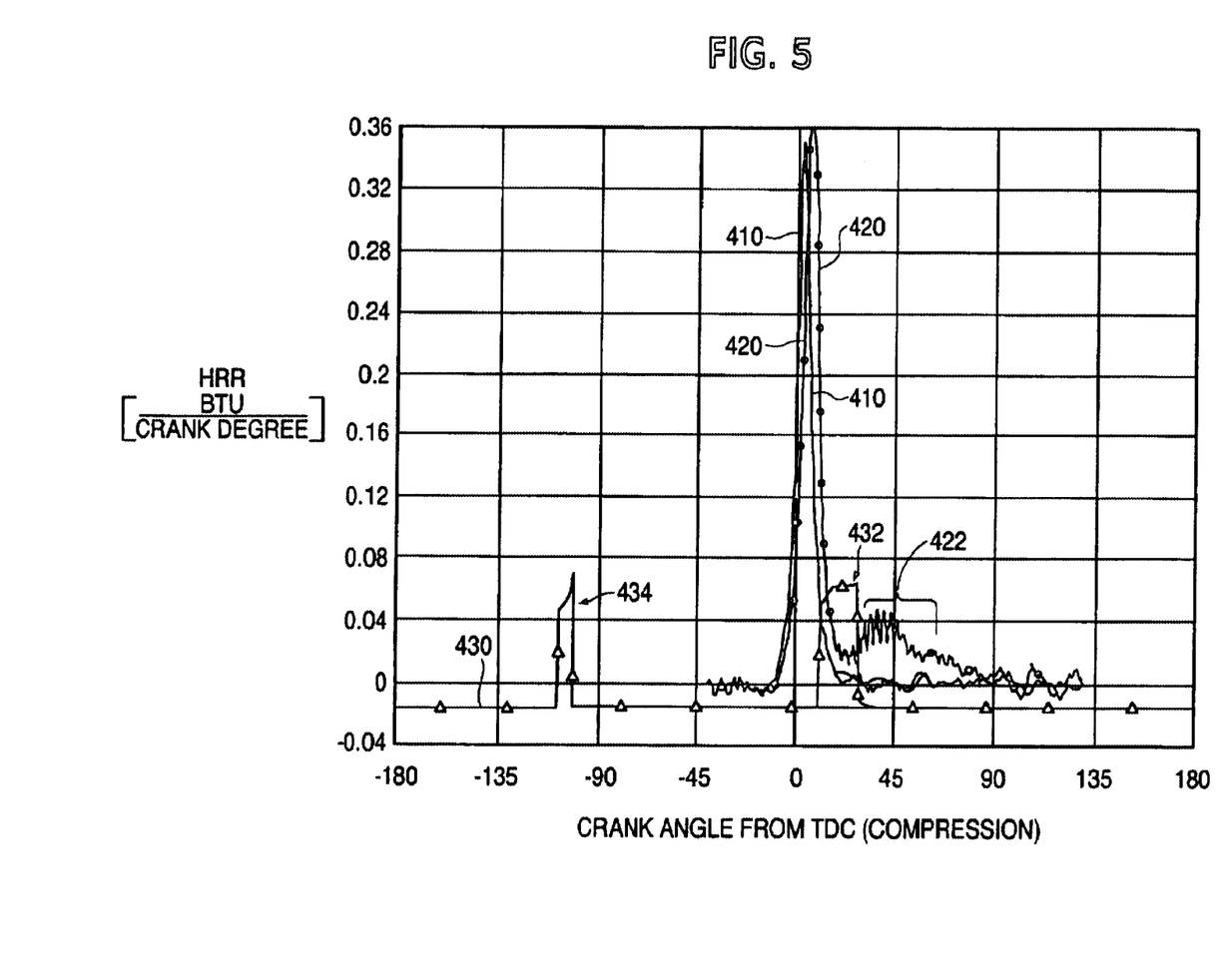
FIG. 5 is a comparative graph showing the heat release rate of an internal combustion engine operating in a conventional PCCI mode and another internal combustion engine operating in a PCCI mode in accordance with one embodiment of the present invention.

FIG. 5 shows a comparative graph of the heat release rate of an internal combustion engine operating in a conventional PCCI mode and another internal combustion engine operating in a PCCI mode in accordance with one embodiment of the present invention. As can be seen, the x-axis indicates the crank angle position from top dead center compression (TDC compression) while the y-axis indicates the heat release rate at the indicated crank angle as measured in BTU/Crank Degree. Line 410 graphs the heat release of an internal combustion engine operating in a conventional PCCI mode. As can be seen, in the illustrated example, the heat release rate increases dramatically near TDC compression (0 degree) and quickly tapers off at around 5 degree after TDC compression.

Line 420 of FIG. 5 graphs the heat release of an example internal combustion engine operating in a PCCI mode in accordance with the present invention in which the first fuel is natural gas and the second fuel injected by a direct fuel injector is diesel. Line 420 is marked with circles for the purpose of distinguishing line 420 from line 410 discussed above and the circles do not have any other significance. As can be seen, the heat release rate of the internal combustion engine having post-ignition injection in accordance with the present invention increases dramatically near TDC compression (0 degree) and quickly tapers off at around 5 degree after TDC compression like line 410 representing conventional PCCI combustion. However, line 420 exhibits a late increase in heat release rate as can be seen in portion 422 of line 420 which was caused by the diesel (i.e. second fuel) directly injected into the combustion chamber after the ignition of the natural gas (i.e. first fuel).

FIG. 5 also includes line 430 marked by triangles that shows the crank angle positions in which an electrical current was provided to the direct fuel injector in accordance with the present invention so that the needle valve of the direct fuel injector is actuated to inject the diesel fuel into the combustion chamber. The portion of the current numbered 432 indicates crank angle position during which the post-ignition injection occurred. As can be seen by the current 432, in this particular example, the post-ignition injection of the second fuel occurred from approximately 10 degrees to 30 degrees after TDC compression. Thus, in accordance with the present invention, the second fuel is directly injected into the combustion chamber after onset of ignition of the premixed charge as shown and in the manner described above, and preferably during the combustion of the premixed charge or shortly thereafter. It should also be noted that line 430 of FIG. 5 further illustrates how the direct fuel injector may be further adapted to inject a pilot injection directly into the combustion chamber prior to ignition of the premixed charge. This is shown by the portion of the current numbered 434 which occurs at approximately −110 degrees before TDC compression. As discussed previously, this pilot injection allows timing of the start of combustion of the premixed charge in the combustion chamber.

Figure 6:
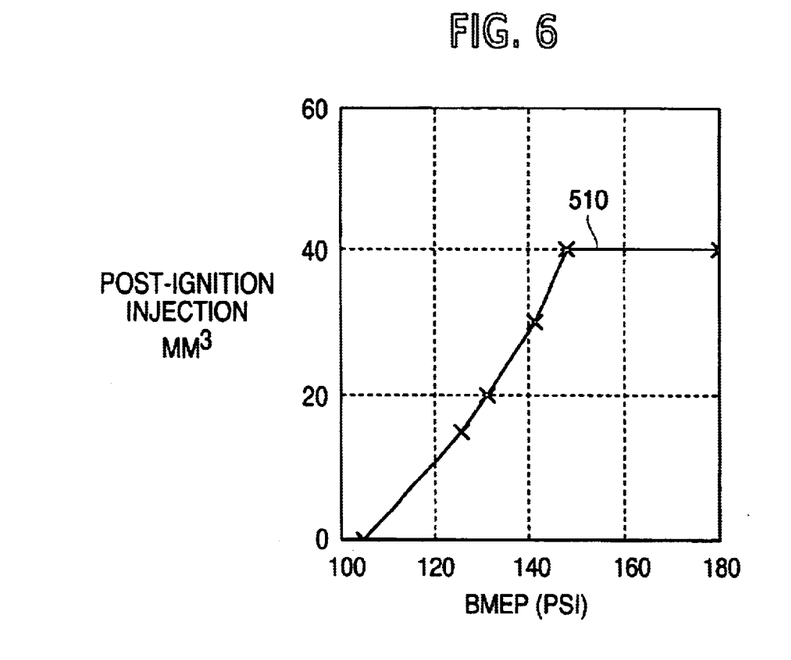
FIG. 6 is a graph showing the amount of second fuel directly injected into the combustion chamber and the corresponding brake mean effective pressure of in internal combustion engine operating in a PCCI mode in accordance with one embodiment of the present invention.

FIG. 6 shows line 510 that indicates the amount of second fuel directly injected into the combustion chamber in a single post-ignition injection event of in internal combustion engine operating in a PCCI mode in accordance with one embodiment of the present invention, such as during the valve lift 432 shown in FIG. 5. The amount of second fuel injected is shown at corresponding brake mean effective pressure (BMEP) in pounds per square inch (psi). As can be seen, in the example shown in FIG. 6, the amount of post-ignition injection is gradually increased up to approximately 40 mm$^3$ per injection as the BMEP is increased, again this being merely one example of the amount injected by the direct injector. As previously discussed, to ensure minimal exhaust emissions especially in applications where the second fuel is diesel and the first fuel is natural gas, the amount of second fuel injected during the post-ignition injection preferably constitutes 0.1 to 50 percent of total fuel combusted in the combustion chamber and most preferably, constitutes 0.1 to 25 percent of total fuel combusted in the combustion chamber.

Figure 7:
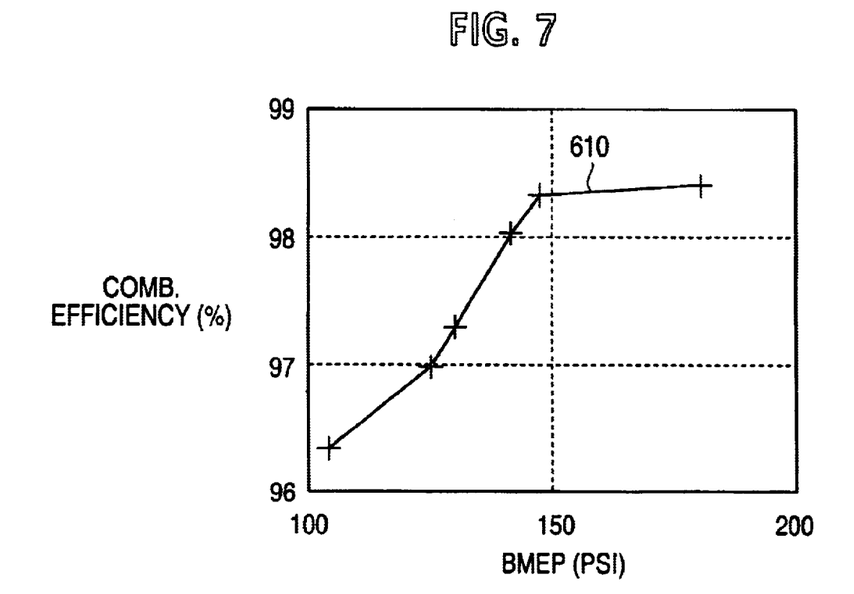
FIG. 7 is a graph showing the combustion efficiency and corresponding brake mean effective pressures of an internal combustion engine operating in a PCCI mode in accordance with one embodiment of the present invention.

FIG. 7 shows line 610 that indicates combustion efficiency of the internal combustion engine operating in a PCCI mode of FIG. 6 where again, the first fuel is natural gas and the second fuel is diesel, the combustion efficiency being shown at corresponding BMEP. As can be seen, in the example of FIG. 7, as the brake mean effective pressure is increased to above 150 psi BMEP, the combustion efficiency also increases and peaks at approximately 98.3% efficiency as the post-ignition injection is increased in the manner shown in FIG. 6 discussed above. This means that at the higher BMEP, 98.3% of the total fuel in the combustion chamber available for combustion has been combusted and only a fractional amount of approximately 1.7% of the fuel energy is not combusted. Thus, as shown in this example, improved combustion efficiencies and higher BMEP levels may be attained by an internal combustion engine with a post-ignition injection in accordance with the present invention. As should be apparent to one of ordinary skill in the art, this increase in BMEP levels is especially advantageous in mid to heavy load operating conditions of the internal combustion engine.

Figure 8A:
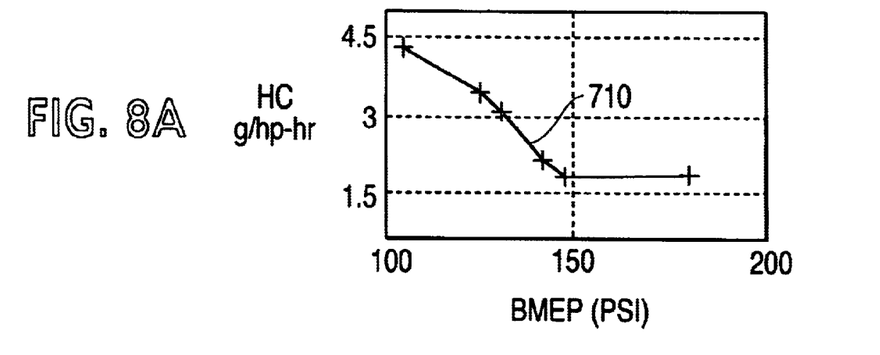
FIG. 8A is a graph showing hydrocarbon emissions levels and corresponding brake mean effective pressures of an internal combustion engine operating in a PCCI mode in accordance with one embodiment of the present invention.
Figure 8B:
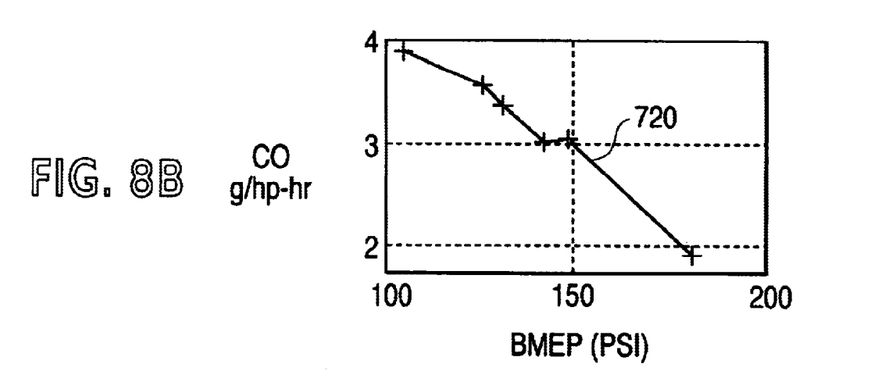
FIG. 8B is a graph showing carbon monoxide emissions levels and corresponding brake mean effective pressures of an internal combustion engine of FIG. 8A.
Figure 8C:
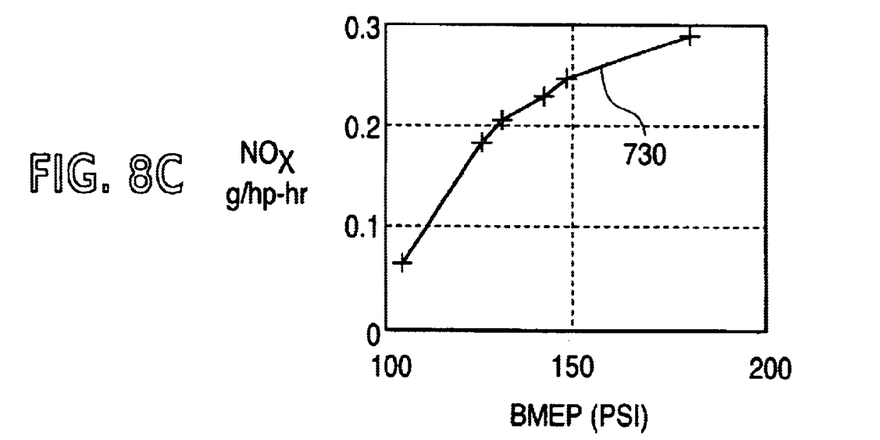
FIG. 8C is a graph showing nitrogen oxide emissions levels and corresponding brake mean effective pressures of an internal combustion engine of FIG. 8A.

FIGS. 8A to 8C each show various measured emission levels of the internal combustion engine of FIGS. 6 and 7 operating in a PCCI mode where the first fuel is natural gas and the second fuel directly injected into the combustion chamber is diesel. These various measured emission levels are shown at corresponding BMEP along the x-axis of FIG. 8C which applies to FIGS. 8A an 8B as well. In particular, line 710 FIG. 8A shows hydrocarbon (HC) emissions levels which steadily decrease as BMEP increases to approximately 150 psi BMEP as the post-ignition is increased in the manner shown in FIG. 6 discussed above, this increase in BMEP being due to the post-ignition injection of the second fuel. As can be seen, in this particular example, the HC emissions level stabilizes at approximately 2 grams per horsepower-hour (g/hp-hr). Line 720 of graph FIG. 8B shows carbon monoxide (CO) emissions levels which steadily decrease to approximately 2 g/hp-hr at 180 psi BMEP. Line 730 of FIG. 8C shows nitrogen oxide (NOx) emission levels which, as can be seen, steadily increases as BMEP levels increase but remains relatively low as compared to prior art diesel engines. In addition, the provisions of a post-ignition injection has also been found to aid in elevating exhaust temperatures which in turn, improves efficiency of any catalyst (not shown) provided downstream of the exhaust valve to further reduce emission levels. Moreover, such elevated exhaust temperatures would aid in turbocharger (not shown) performance if a turbocharger is provided. Thus, as shown in by these figures, reductions in exhaust emissions may be attained and BMEP increased by an internal combustion engine with a post-ignition injection in accordance with the present invention. In addition, as previously noted, this increase in BMEP levels is especially advantageous in mid to heavy load operating conditions of the internal combustion engine.

Thus, as described in detail above, internal combustion engines in accordance with the embodiments of the present invention may be operated by delivering at least intake air to the combustion chamber during an intake stroke of the piston assembly, mixing the first fuel with the intake air to provide a premixed charge of air and the first fuel, performing a compression stroke of the piston assembly, igniting the premixed charge, and directly injecting the second fuel into the combustion chamber after the onset of ignition of the premixed charge. The second fuel directly injected into the combustion chamber may constitute 0.1 to 50 percent of total fuel combusted in the combustion chamber, or preferably, constitute 5 to 25 percent of total fuel combusted in the combustion chamber. In addition, by controlling at least one of injection timing, injection duration, injection rate and injection amount of the second fuel based on an operating condition of the internal combustion engine and/or as otherwise directed by the operator, the combustion characteristics can be optimized. Moreover, if the internal combustion engine includes a plurality of cylinders, the amount of second fuel injected may be varied in fewer than all of the plurality of cylinders at a time to aid in transitioning between the operating modes of the engine.

In addition, as also previously described, the internal combustion engines in accordance with the present invention may be operated by sensing cylinder pressure in the combustion chamber, and directly injecting the second fuel based on sensed cylinder pressure. In this regard, the second fuel may be directly injected into the combustion chamber upon sensing a predetermined reduction in cylinder pressure in the combustion chamber, and/or the injection rate of the second fuel may be controlled to maintain a substantially constant cylinder pressure in the combustion chamber for a predetermined range of motion of the piston assembly, the substantially constant cylinder pressure being not greater than a desired maximum cylinder pressure in the combustion chamber.

As also previously described, the first fuel may be mixed with the air by at least one of a carburetor, a throttle body injector, a port fuel injector that injects the first fuel into the air upstream of the combustion chamber, and a direct fuel injector that injects the first fuel into the air in the combustion chamber. Moreover, the present method may also include the step of injecting a pilot injection prior to ignition of the premixed charge to time the start of combustion of the premixed charge in the combustion chamber. In the above described manner, the internal combustion engine in accordance with the present invention may be effectively operated in the PCCI mode to increase fuel efficiency while minimizing exhaust emissions as evidenced by FIGS. 7 to 8C.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An internal combustion engine operable in a premixed charge compression ignition mode where at least a portion of fuel is combusted in a PCCI combustion event, comprising:

an engine body with a piston assembly;

a combustion chamber formed in said engine body by said piston assembly;

an intake system for delivering intake air to said combustion chamber;

a mixing device that mixes a first fuel with said intake air to provide a premixed charge of air and said first fuel;

a direct fuel injector adapted to directly inject a second fuel into said combustion chamber; and a control system adapted to control said direct fuel injector in a manner to provide a post-ignition injection wherein said second fuel is directly injected into said combustion chamber after onset of ignition of said premixed charge in said combustion chamber.

2. The internal combustion engine of claim 1, wherein said second fuel is injected into said combustion chamber at least one of during combustion of said premixed charge and shortly after combustion of said premixed charge in said combustion chamber.

3. The internal combustion engine of claim 1, wherein said first fuel and said second fuel are both same type of fuel.

4. The internal combustion engine of claim 3, wherein said first fuel and said second fuel are both natural gas.

5. The internal combustion engine of claim 1, wherein said first fuel and said second fuel are different types of fuels.

6. The internal combustion engine of claim 5, wherein said first fuel is natural gas and said second fuel is diesel.

7. The internal combustion engine of claim 1, wherein said control system is further adapted to control at least one of injection timing, injection duration, injection rate and injection amount of said second fuel injected by said direct fuel injector.

8. The internal combustion engine of claim 7, wherein said control system is adapted to variably control amount of said second fuel injected by said direct fuel injector relative to amount of said first fuel based on at least one of an operating condition and operating mode of said internal combustion engine.

9. The internal combustion engine of claim 8, wherein said engine body includes a plurality of cylinders each having a piston assembly that forms a combustion chamber, said control system being further adapted to vary amount of said second fuel injected by said direct fuel injector in fewer than all of said plurality of cylinders at a time.

10. The internal combustion engine of claim 1, wherein said second fuel injected by said direct fuel injector constitutes 0.1 to 50 percent of total fuel combusted in said combustion chamber.

11. The internal combustion engine of claim 10, wherein said second fuel injected by said direct fuel injector constitutes 0.1 to 25 percent of total fuel combusted in said combustion chamber.

12. The internal combustion engine of claim 1, further including a sensor that generates a signal indicative of cylinder pressure in said combustion chamber.

13. The internal combustion engine of claim 12, wherein said sensor is at least one of a pressure sensor, accelerometer, ion probe, optical diagnostic, strain gage, load washer, fast thermocouple, torque sensor, RPM sensor and emissions sensor.

14. The internal combustion engine of claim 12, wherein said direct fuel injector injects said second fuel when said sensor senses a predetermined reduction in cylinder pressure in said combustion chamber.

15. The internal combustion engine of claim 12, wherein injection rate of said second fuel is controlled by said control system to maintain a substantially constant cylinder pressure that is not greater than a desired maximum cylinder pressure during a predetermined range of motion of said piston assembly.

16. The internal combustion engine of claim 1, wherein said mixing device includes at least one of a carburetor, a throttle body injector, and a port fuel injector that is adapted to mix air and said first fuel upstream of said combustion chamber.

17. The internal combustion engine of claim 1, wherein said mixing device is a fuel injecting device adapted to directly inject said first fuel into said combustion chamber.

18. The internal combustion engine of claim 17, further including a high pressure system for pressurizing said first fuel prior to directly injecting said first fuel into said combustion chamber.

19. The internal combustion engine of claim 17, wherein said fuel injecting device is said direct fuel injector so that said direct fuel injector provides both said first fuel and said second fuel to said combustion chamber.

20. The internal combustion engine of claim 17, wherein said mixing device is a first direct fuel injector adapted to directly inject said first fuel into said combustion chamber and said direct fuel injector is a second direct fuel injector adapted to directly inject said second fuel into said combustion chamber.

21. The internal combustion engine of claim 1, wherein at least one of said mixing device and said direct fuel injector is further adapted to provide an injection prior to ignition of said premixed charge to time the start of combustion of said premixed charge in said combustion chamber.

22. The internal combustion engine of claim 21, wherein said injection provided prior to ignition of said premixed charge is at least one of a pilot injection and an early control injection.

23. The internal combustion engine of claim 5, wherein said control system is further adapted to variably control amount of said second fuel injected by said direct fuel injector relative to amount of said first fuel based on at least one of an operating condition and operating mode of said internal combustion engine.

24. The internal combustion engine of claim 23, wherein said second fuel is injected into said combustion chamber at least one of during combustion of said premixed charge and shortly after combustion of said premixed charge in said combustion chamber.

25. The internal combustion engine of claim 23, wherein said engine body includes a plurality of cylinders each having a piston assembly that forms a combustion chamber, said control system being further adapted to vary amount of said second fuel injected by said direct fuel injector in fewer than all of said plurality of cylinders at a time.

26. The internal combustion engine of claim 23, wherein said second fuel injected by said direct fuel injector constitutes 0.1 to 50 percent of total fuel combusted in said combustion chamber.

27. The internal combustion engine of claim 26, wherein said mixing device includes at least one of a carburetor, a throttle body injector, and a port fuel injector that is adapted to mix air and said natural gas upstream of said combustion chamber.

28. The internal combustion engine of claim 27, further including a sensor that generates a signal indicative of cylinder pressure in said combustion chamber.

29. The internal combustion engine of claim 28, wherein said direct fuel injector injects said second fuel upon sensing a predetermined reduction in cylinder pressure in said combustion chamber.

30. The internal combustion engine of claim 29, wherein injection rate of said second fuel is controlled by said control system to maintain a substantially constant cylinder pressure that is not greater than a desired maximum cylinder pressure during a predetermined range of motion of said piston assembly.

31. The internal combustion engine of claim 30, wherein at least one of said mixing device and said direct fuel injector is further adapted to provide an injection prior to ignition of said premixed charge to time the start of combustion of said premixed charge in said combustion chamber.

32. A method of operating an internal combustion engine in a premixed charge compression ignition mode where at least a portion of fuel is combusted in a PCCI combustion event, said internal combustion engine having a piston assembly defining a combustion chamber, comprising the steps of:

delivering at least intake air to said combustion chamber during an intake stroke of said piston assembly;

mixing a first fuel with said intake air to provide a premixed charge of air and said first fuel;

performing a compression stroke of said piston assembly after said intake stroke;

igniting said premixed charge; and directly injecting a second fuel into said combustion chamber after onset of ignition of said premixed charge.

33. The method of claim 32, wherein said second fuel is directly injected into said combustion chamber at least one of during the combustion of said premixed charge and shortly after combustion of said premixed charge in said combustion chamber.

34. The method of claim 32, wherein said first fuel and said second fuel are both same type of fuel.

35. The method of claim 34, wherein said first fuel and said second fuel are both natural gas.

36. The method of claim 32, wherein said first fuel and said second fuel are different types of fuels.

37. The method of claim 36, wherein said first fuel is natural gas and said second fuel is diesel.

38. The method of claim 32, further including the step of controlling at least one of injection timing, injection duration, injection rate and injection amount of said second fuel based on an operating condition of said internal combustion engine.

39. The method of claim 38, further including the step of variably controlling amount of said second fuel injected by said direct fuel injector relative to amount of said first fuel based on at least one of an operating condition and operating mode of said internal combustion engine.

40. The method of claim 39, wherein said internal combustion engine includes a plurality of cylinders each having a piston assembly that forms a combustion chamber, further including the step of varying amount of said second fuel injected in fewer than all of said plurality of cylinders at a time.

41. The method of claim 32, wherein said second fuel directly injected into said combustion chamber constitutes 0.1 to 50 percent of total fuel combusted in said combustion chamber.

42. The method of claim 41, wherein said second fuel directly injected into said combustion chamber constitutes 0.1 to 25 percent of total fuel combusted in said combustion chamber.

43. The method of claim 32, further including the step of sensing a signal indicative of cylinder pressure in said combustion chamber, and directly injecting said second fuel based on said sensed signal indicative of said cylinder pressure.

44. The method of claim 43, wherein said cylinder pressure is sensed by a sensor that generates a signal indicative of cylinder pressure, said sensor being at least one of a pressure sensor, accelerometer, ion probe, optical diagnostic, strain gage, load washer, fast thermocouple, torque sensor, RPM sensor and emissions sensor.

45. The method of claim 43, wherein said second fuel is directly injected into said combustion chamber upon sensing a predetermined reduction in cylinder pressure in said combustion chamber.

46. The method of claim 43, further including the step of controlling the injection rate of said second fuel to maintain a substantially constant cylinder pressure in said combustion chamber for a predetermined range of motion of said piston assembly, said substantially constant cylinder pressure being not greater than a desired maximum cylinder pressure in said combustion chamber.

47. The method of claim 32, wherein said first fuel is mixed with said air by at least one of a carburetor, a throttle body injector, a port fuel injector that injects said first fuel into said air upstream of said combustion chamber, and a direct fuel injector that injects said first fuel into said air in said combustion chamber.

48. The method of claim 32, further including the step of providing an injection of fuel prior to onset of ignition of said premixed charge to time start of combustion of said premixed charge in said combustion chamber.

49. The method of claim 48, wherein said injection of fuel prior to onset of ignition of said premixed charge is at least one of a pilot injection and an early control injection.

50. The method of claim 36, further comprising the step of variably controlling amount of said second fuel injected relative to amount of said first fuel based on at least one of an operating condition and operating mode of said internal combustion engine.

51. The method of claim 50, wherein said internal combustion engine includes a plurality of cylinders each having a piston assembly that forms a combustion chamber, further including the step of varying amount of said second fuel injected in fewer than all of said plurality of cylinders at a time.

52. The method of claim 50, wherein said second fuel is directly injected into said combustion chamber at least one of during combustion of said premixed charge and shortly after combustion of said premixed charge in said combustion chamber.

53. The method of claim 52, wherein said second fuel directly injected into said combustion chamber constitutes 0.1 to 50 percent of total fuel combusted in said combustion chamber.

54. The method of claim 53, further including the step of sensing a signal indicative of cylinder pressure in said combustion chamber, and directly injecting said second fuel based on said sensed signal indicative of said cylinder pressure.

55. The method of claim 54, wherein the step of sensing cylinder pressure is attained by a pressure sensor, accelerometer, ion probe, optical diagnostic, strain gage, load washer, fast thermocouple, torque sensor, RPM sensor and emissions sensor.

56. The method of claim 55, wherein said second fuel is directly injected into said combustion chamber upon sensing a predetermined reduction in cylinder pressure in said combustion chamber.

57. The method of claim 56, further including the step of controlling the injection rate of said second fuel to maintain a substantially constant cylinder pressure in said combustion chamber for a predetermined range of motion of said piston assembly, said substantially constant cylinder pressure being not greater than a desired maximum cylinder pressure in said combustion chamber.

58. The method of claim 57, further including the step of injecting a pilot injection prior to ignition of said premixed charge to time start of combustion of said premixed charge in said combustion chamber.

* * * * *